United States Patent
Bacus et al.

(10) Patent No.: US 8,555,162 B2
(45) Date of Patent: Oct. 8, 2013

(54) ACTIVATION OF FONTS USING FONT SETS

(75) Inventors: Mike Bacus, Tigard, OR (US); Chadlee Ray Slater, Tigard, OR (US)

(73) Assignee: Celartem, Inc., Portland, OR (US)

( * ) Notice: Subject to any disclaimer, the term of this patent is extended or adjusted under 35 U.S.C. 154(b) by 1020 days.

(21) Appl. No.: 12/580,712

(22) Filed: Oct. 16, 2009

(65) Prior Publication Data

US 2011/0090229 A1     Apr. 21, 2011

(51) Int. Cl.
    *G06F 17/00*     (2006.01)
(52) U.S. Cl.
    USPC ........... 715/269; 715/234; 715/256; 715/760; 715/273
(58) Field of Classification Search
    USPC ......... 715/200–202, 204, 205, 226, 234, 254, 715/255, 269, 273, 700, 731, 760, 762–765, 715/256, 738, FOR. 209, FOR. 223, 715/FOR. 236, FOR. 239, FOR. 241, 715/FOR. 252
    See application file for complete search history.

(56) References Cited

U.S. PATENT DOCUMENTS

| | | | | |
|---|---|---|---|---|
| 5,533,180 | A * | 7/1996 | Zhou et al. | 345/467 |
| 5,586,242 | A * | 12/1996 | McQueen et al. | 345/467 |
| 6,512,531 | B1 * | 1/2003 | Gartland | 345/467 |
| 6,882,344 | B1 * | 4/2005 | Hayes et al. | 345/467 |
| 7,761,811 | B1 * | 7/2010 | Chaudhri | 715/835 |
| 2002/0136578 | A1 * | 9/2002 | Johnson et al. | 400/70 |
| 2004/0177056 | A1 * | 9/2004 | Davis et al. | 707/1 |
| 2005/0080839 | A1 * | 4/2005 | Kuwata et al. | 709/200 |
| 2007/0242072 | A1 * | 10/2007 | Fattic et al. | 345/471 |

* cited by examiner

*Primary Examiner* — Maikhanh Nguyen
(74) *Attorney, Agent, or Firm* — Banner & Witcoff, Ltd.

(57) ABSTRACT

Fonts may be activated based on the applications that are launched or operating on a computing device. Accordingly, if an application needs a particular set of fonts, the fonts may be activated upon launching of that application. Fonts may further be deactivated when they are no longer necessary or needed by the application (e.g., when the application is terminated). If supported by an operating system, instead of activating and deactivating the fonts, fonts may be pre-activated and then hidden from the operating system. The pre-activated fonts may be revealed when needed for the applications and then hidden again when the applications terminate.

15 Claims, 7 Drawing Sheets

ACTIVATION OF FONTS USING FONT SETS

FIELD OF ART

The invention relates generally to the activation of fonts in computing systems. More specifically, the invention provides for the automatic activation of fonts for applications using font sets.

BACKGROUND

The current paradigm in third party font management is to automatically activate fonts on open documents using plug-ins that operate within the process space of desktop publishing applications. Most modern operating systems contain application program interfaces (APIs) for activating fonts globally. All processes running on the operating system can see and use the globally active fonts. However, the APIs provided by the desktop publishing applications for plug-in development by third party vendors/developers are remarkably diverse. The lack of uniformity presents great difficulty for third party vendors to develop efficient plug-ins that would offer universal compatibility. There is little commonality of messaging or functionality provided, even across different versions of the same application or different applications that are sold in the same suite, Adobe®, for example.

In some systems, applications do not react to fonts activated after the application has been launched, and these applications simply fail to populate the font menu selection drop down box to include these activated fonts. Further, for those applications that do not react to system messages indicating that a new font is active on the operating system, activating fonts after the application is launched will not allow the user to see the document rendered in the way it was designed to be seen. That is, even though the fonts chosen for the document are active and available on the operating system, certain applications only populate font lists at start-up and will not render the text in the correct type face. These applications assume that a font activated after launch is missing and will substitute an alternative type face.

Furthermore, pre-loading all fonts that applications installed on a system might use would be inefficient and may require significant resource expenditure by the system. For example, some fonts might be specific to a single application. Thus, occupying system resources for those fonts that are only used by a single or a few applications that are not always active would be wasteful.

BRIEF SUMMARY

The following presents a simplified summary in order to provide a basic understanding of some aspects of the invention. The summary is not an extensive overview of the invention. It is neither intended to identify critical elements of the invention nor to delineate the scope of the invention. To overcome limitations in the prior art described above, and to overcome other limitations that will be apparent upon reading and understanding the present specification, the present invention is directed to apparatuses and methods for auto activating fonts for applications using font sets.

Aspects of the present disclosure provide for the creation of a font set in a font manager. The font set may be associated with specific applications. For example, the font set may include a collection of fonts the user would like to activate when the application associated with that font set is launched. When the font manager is notified by the operating system that an application process corresponding to a font set managed by the font manager is launched, the font manager may interrupt the application process from completing its launch. During the interrupt, the font manger may activate the font sets associated with that process/application. Once all of the fonts of the font set corresponding to the application have been activated, the font manager may allow the process/application to continue to launch. Such processes would also provide support for applications that might otherwise fail to recognize font activations post launch.

According to another aspect, automatic activation of fonts in a manner that is quick and transparent to the end user is provided. For example, in one or more operating systems such as the Mac OS X, it is possible for the font manager to pre-activate fonts and hide them from the operating system. When the font manager receives a signal to activate the font sets, it can unhide/reveal them from the operating system. This approach may be faster than activating each font individually in the font sets.

According to yet another aspect, hiding or deactivating font sets upon application shut down may be provided. For example, the font manager may monitor and receive a signal from the operating system indicating that a process/application has terminated and can either hide the fonts in the font set or deactivate the fonts.

BRIEF DESCRIPTION OF THE DRAWINGS

Various objects, features, and advantages of the present disclosure will be more readily apparent and more fully understood from the following detailed description, taken in connection with the appended drawings, in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
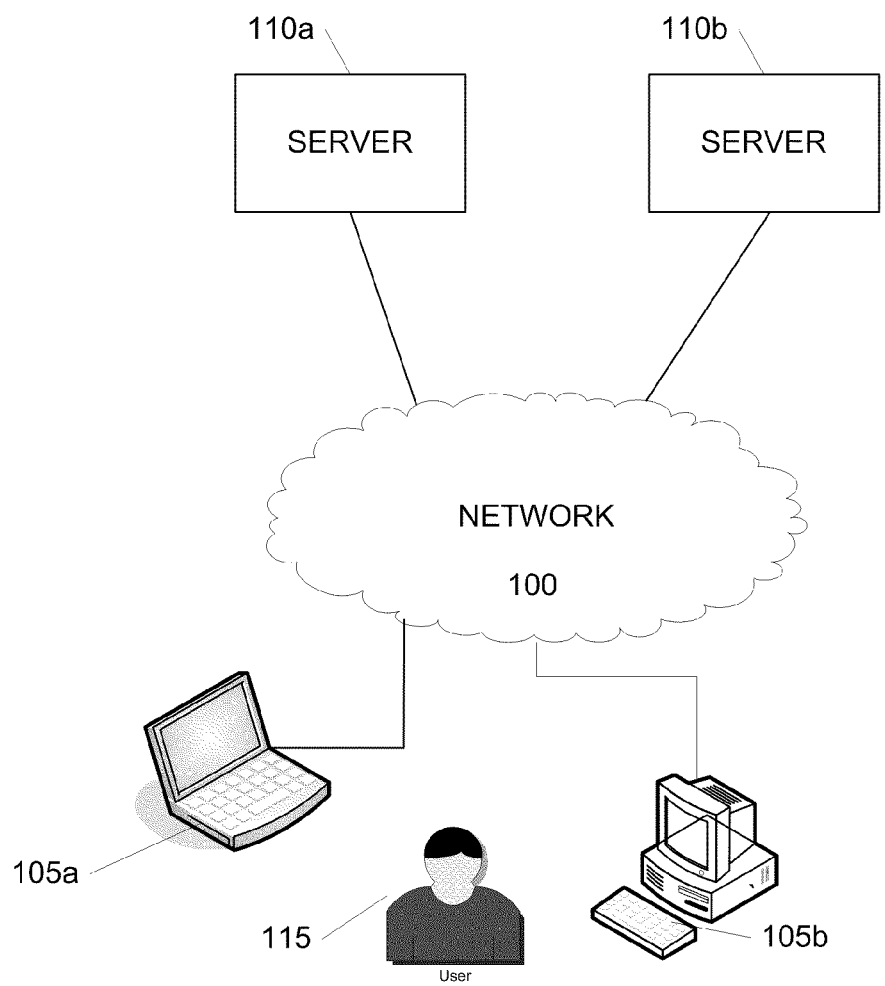
FIG. 1 illustrates an example computing environment in which one or more aspects of the present disclosure may be used.

FIG. 1 illustrates a computing environment in which font sets may be created and managed in a number of different devices such as a laptop computer 105a or a desktop computer 105b. Other devices that may be used or included in the computing environment of FIG. 1 include personal data assistants (PDAs), mobile telephones, electronic reading devices (e-readers) and the like. Computing devices 105a, 105b may be connected to a network 100, or alternatively they may be used offline. The network 100 is configured to provide communications between a variety of devices, including servers 110a, 110b, and computing devices 105a, 105b. Such communications may conform to one or more communication protocols including Internet Protocol (IP), Hyper Text Transfer Protocol (HTTP), File Transfer Protocol (FTP) and the like. According to one or more arrangements, servers 110a, 110b may include repositories of font files, font sets and other font related data that may be provided to the user 115 or used by a font manager in facilitating activation/deactivation of fonts.

Figure 2:
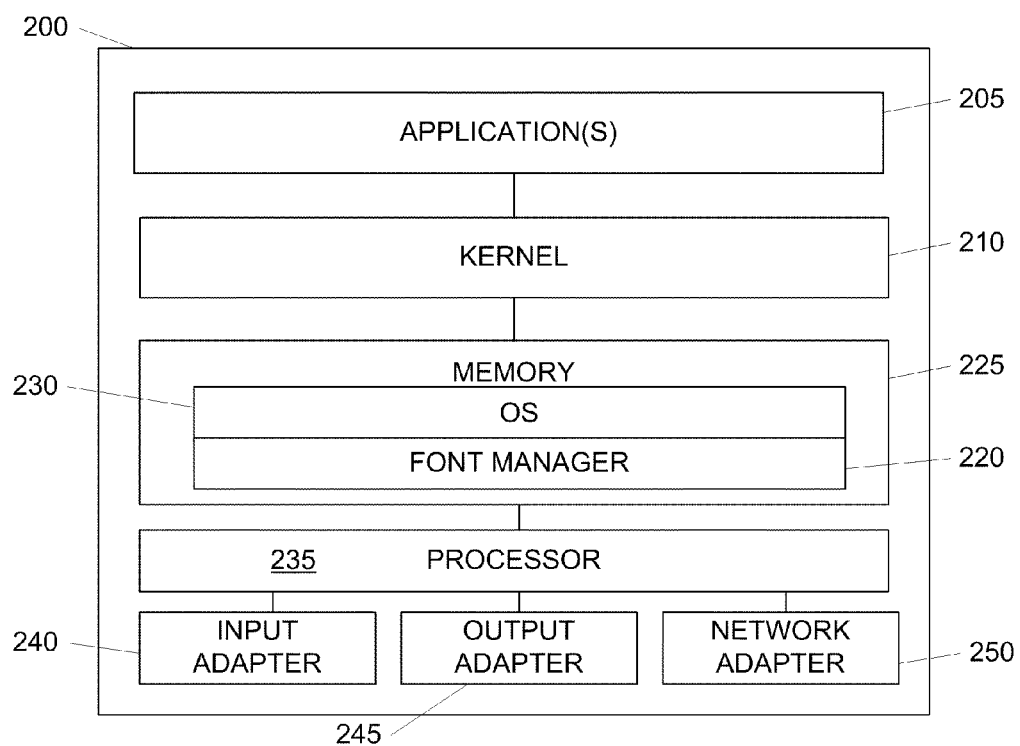
FIG. 2 illustrates a block diagram of an example computing device.

FIG. 2 illustrates components of a computing device 200, comprising an applications layer 205, a kernel 210, and a hardware layer including memory 225 and processor 235. The operating system (OS) 230 as well as the font manager 220 may reside in the memory 225 of the computing device 200. The kernel 210 manages the system's resources by facilitating communications between applications in the application layer 205 and the memory 225. The user may use the font manager 220 to manage fonts in a number of ways. For example, the user may install, uninstall, activate, deactivate, share or distribute fonts, as well as organize fonts into groups, categories, or types. Memory 225 may further store computer executable instructions that, when executed by processor 235, may cause the computing device 200 to perform one or more functions described herein. Other apparatuses may also include such memory and operate similarly.

Additionally, computing device 200 may include an input adapter 240, output adapter 245 and network adapter 250. Input adapter 240, for example, may be used to interpret signals from one or more input devices such as a keyboard, a mouse, a stylus, a camera and the like. Output adapter 245, on the other hand, maybe configured to interpret or decode signals and provide output signals to a variety of devices including a display device, a haptic feedback device, speakers or other audio output devices and the like. Network adapter 250 may be used to facilitate communications with wired or wireless wide area networks (WAN) and local area networks (LAN).

Communications between the operating system 230 to the font manager 220 may be enabled by the use of a hook that operates in user-mode (not shown). Alternatively or additionally, a kernel hook 210 may be used to enable communications between operating system 230 and font manager 220. The communications include notification from the operating system 230 to the font manager 220. This approach is not system invasive and might not depend on APIs, whether provided for by the applications. Therefore, this eliminates the need for plug-ins to activate fonts.

Figure 3:
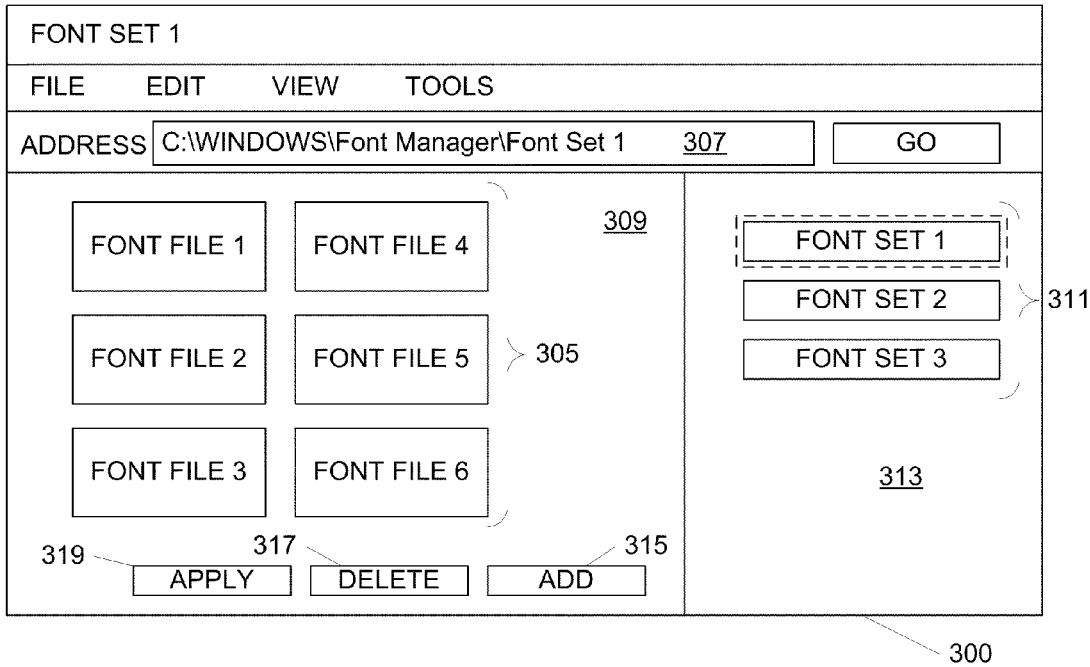
FIG. 3 illustrates an example interface showing a font set according to one or more aspects described herein.

FIG. 3 illustrates a graphical user interface (GUI) 300 that allows a user to create a font set, i.e., a collection of fonts 305. A font set may be associated with an application. A font set may also comprise of any number of fonts 305. Font files generally refer to data files that store the information necessary for a computing device to render all symbols and characters defined for one or more fonts. In one or more arrangements, a reduced font file may include only a subset of symbols or characters defined for the font. While some computing devices may be pre-loaded with a set of standard font files, specialized font files may be provided by third party font vendors to allow the user to be more creative with graphic designs. Font files may be created according to a variety of formats, for example, TrueType, OpenType, or Embedded OpenType. Font files may be downloaded via a network 100 (FIG. 1) from servers 110a, 110b (FIG. 1) or from any other storage device.

The name of font set 305 may be specified in address section 307 while the list of fonts 305 included in the font set may be displayed in portion 309. Fonts 305 may be displayed textually in a list, graphically using representative icons or a combination thereof. A list of available font sets 311 may be displayed in portion 313 so that a user may switch between, manage and/or edit various font sets. Fonts may be added to font set 305 by using add option 315. For example, upon selecting add option 315, a file or font retrieval prompt (not shown) may be displayed to the user to select a further font. Additionally or alternatively, fonts may be dragged and dropped from an available font list (not shown) into portion 309 as a method of adding a font to a font set (e.g., font set 305). Fonts of font set 305 may be deleted or removed from the set by selecting delete option 317 or by placing focus (e.g., highlighting or selecting) one of fonts 305 and selecting a delete button on an input device. Once a user is finished with editing a font set such as font set 305, the user may confirm the edits by selecting apply option 319.

Figure 4:
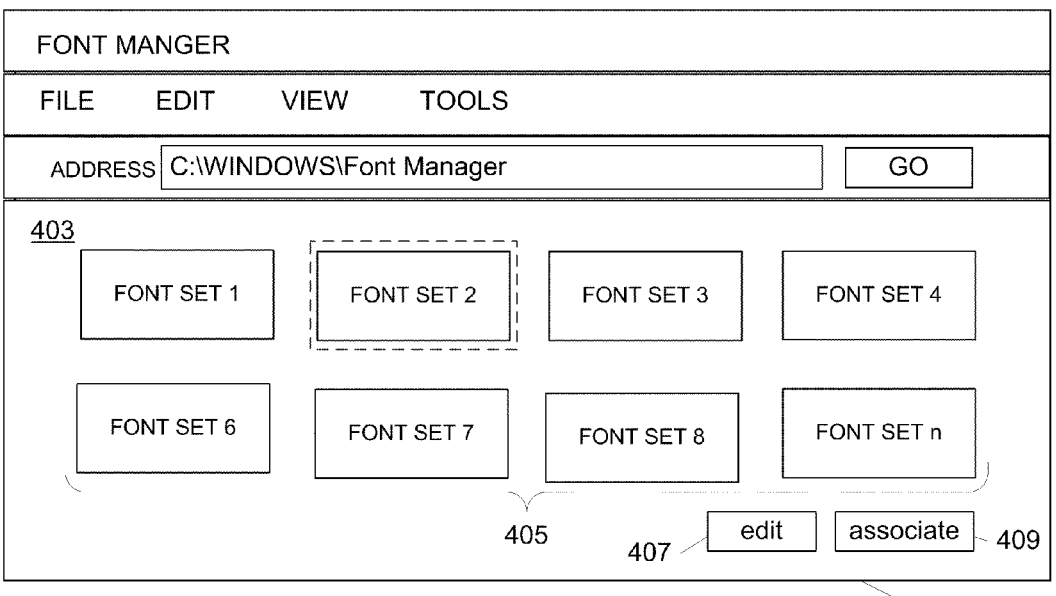
FIG. 4 illustrates another example graphical user interface showing a plurality of font sets that may be created in a font manager according to one or more aspects described herein.

FIG. 4 illustrates another graphical user interface 400 that may allow a user to manage, organize and/or categorize multiple font sets 405 stored in a font manager. Font sets 405 may be identified in portion 403 of interface 400 in text form, graphical form or a combination thereof (e.g., an icon and a name). A user may select, view and/or edit one of font sets 405 by double-clicking the desired font set or highlighting the desired font and selecting edit option 407. Additionally, interface 400 may include an associate option 409 that may be used to associate one of font sets 405 with one or more applications that need or use the fonts in the font set. In one or more examples, the association between an application and a font set may be stored by the font manager. Accordingly, when an application is launched, the operating system may inform the font manager of the application being launched and the font manager may determine the appropriate font sets and fonts to activate.

Figure 5:
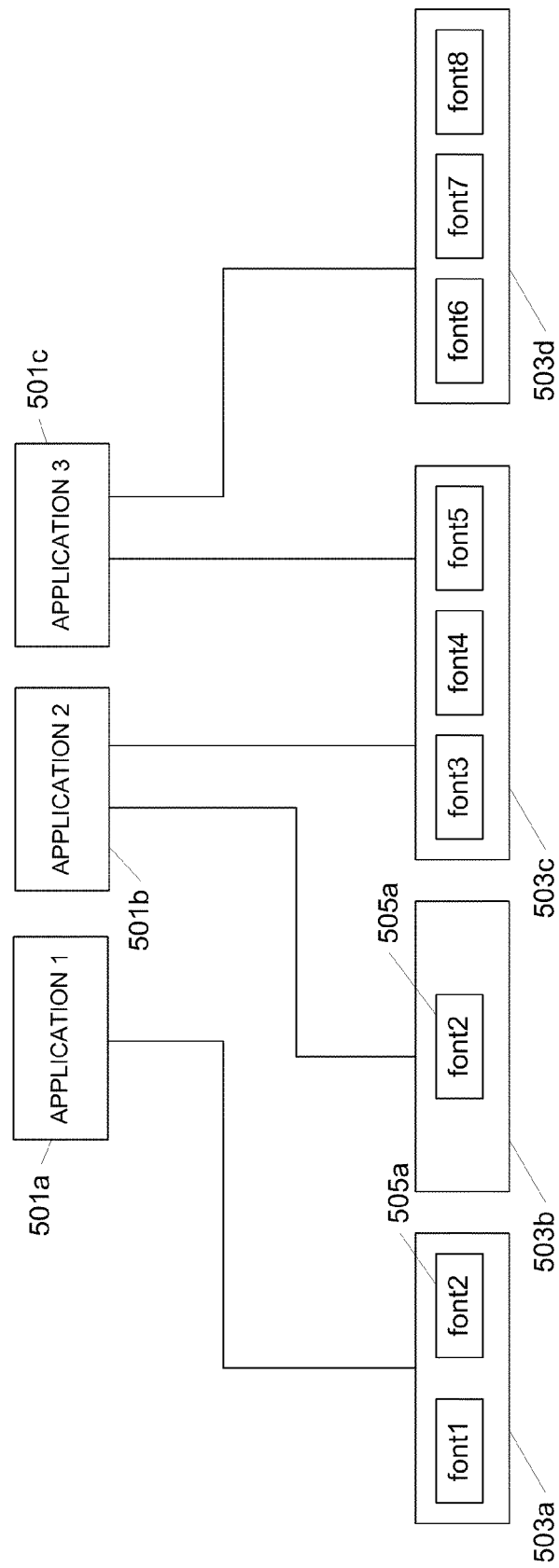
FIG. 5 illustrates associations between various applications and font sets that may be stored and managed by a font manager.

FIG. 5 illustrates associations between applications 501 and font sets 503. Applications 501 may be mapped to one or more font sets 503. For example, application 501a may have a one-to-one mapping with font set 503a, while application 501b may be mapped or associated with multiple font sets 503b and c. Additionally or alternatively, an application such as application 501c may share font set 503c with application 501b. Accordingly, a font set such as font set 503c may have a one to many mapping with applications 501b and 501c.

As further illustrated in FIG. 5, multiple font sets may share one or more fonts and font files corresponding thereto. For example, font sets 503a and 503b may share font 505a. Although font 505a is represented separately in font sets 503a and 503b, it is to be understood that font 505a may correspond to the same font and font file. Thus, once font 505a has been activated or loaded as part of font set 503a, for example, font 505a might not need to be reloaded or reactivated as part of font set 503b when an application associated with and using font set 503b is launched.

Figure 6:
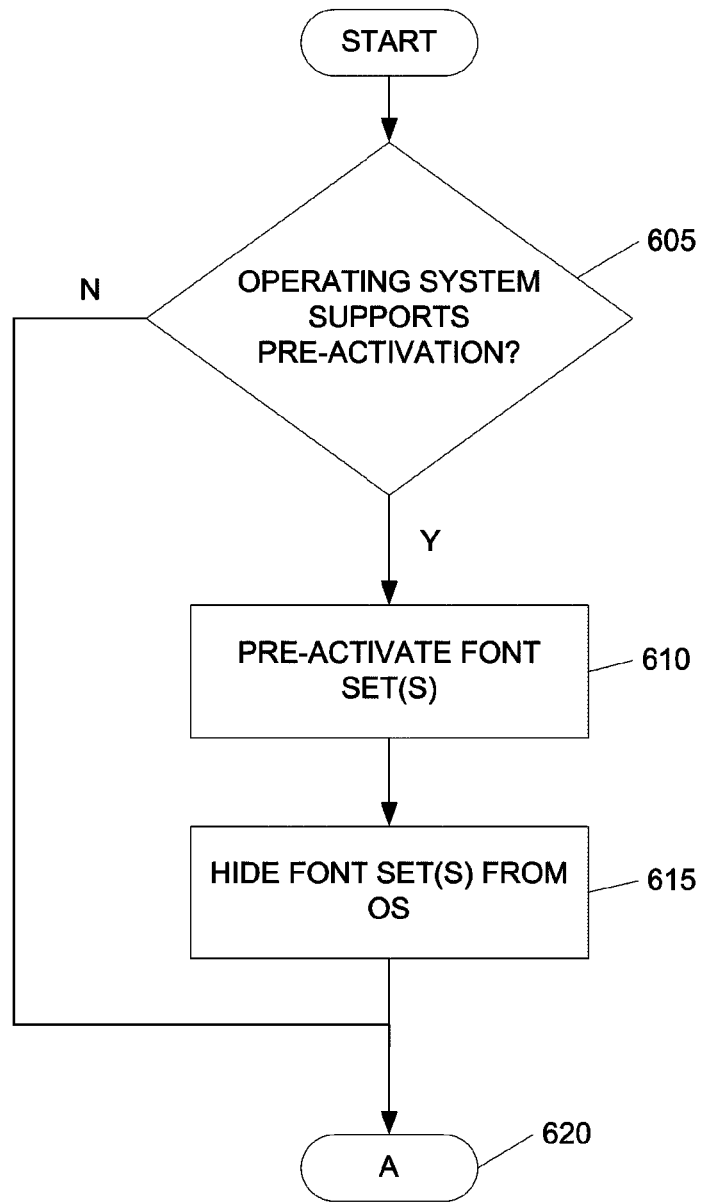
FIG. 6 is a flowchart illustrating an example method for pre-activating font sets according to one or more aspects described herein.

FIG. 6 illustrates a method by which fonts may be pre-activated. In step 605, the font manager may determine whether the operating system supports pre-activation of fonts. In one example, the font manager may use APIs provided by the operating system to identify a name and version of the operating system. Based thereon, the font manager may look up pre-activation support and compatibility information for the operating system. If the operating system supports pre-activation, then in step 610 the font manager pre-activates the fonts of one or more font sets. For example, pre-activation of the fonts may include loading the fonts into RAM for fast retrieval and invocation.

In step 615, the font manager hides the pre-activated fonts from the operating system. Hiding the fonts allows them to be revealed later in a quick manner that is not noticeable by the user. When the fonts are pre-activated and hidden from the operating system, certain application processes, those that are not concerned with the presence of active fonts in the system, will not be continually pre-occupied with font status messages, thereby consuming less system resources. That is, font status messages for the pre-activated/hidden fonts might not be sent to all or some applications operating in the system. In contrast, a fully activated font that is not hidden may have status messages provided to the underlying operating system as well as one or more applications running on the system. For example, when an application activates or deactivates a font, a system message may be sent out to all active processes indicating that a new font is active or has been deactivated. It may be up to the application to decide how to respond to such a message. In some arrangements, applications might not listen to those messages, and resort to polling the font seed instead. The font seed may be an operating system counter that increments and decrements whenever a font is activated and deactivated, respectively. In such arrangements, the application may record the font seed at launch, and periodically (or in response to an end user action) poll the font seed and compare that value to its internal value and if different update its internal list of fonts.

If, on the other hand, the underlying operating system does not support pre-activation, the font manager might not pre-activate the fonts. In either case, the method of FIG. 6 may proceed to step 700 of FIG. 7 where fonts may be fully activated and/or unhidden upon application launch.

Figure 7:
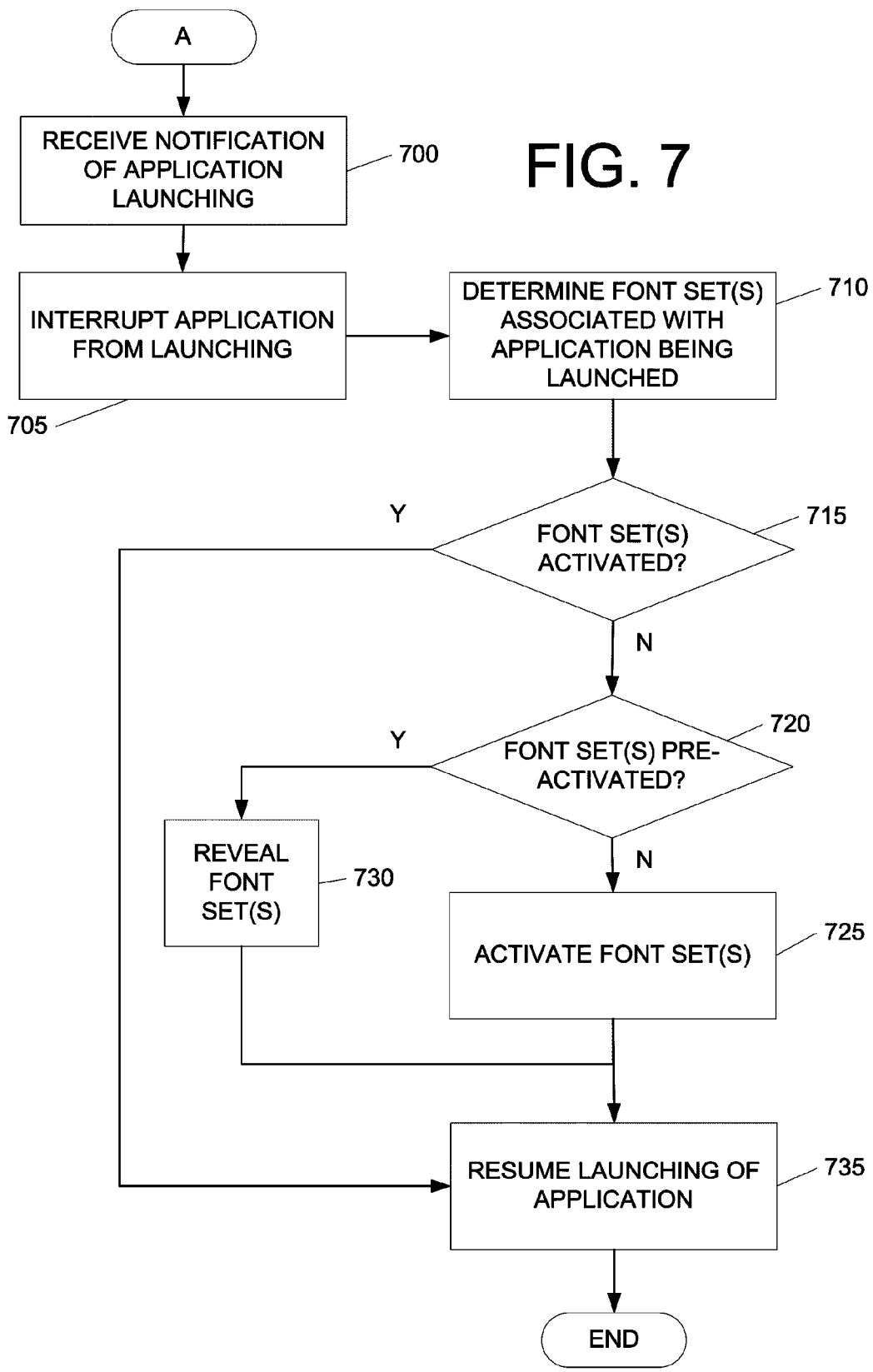
FIG. 7 is a flowchart illustrating an example method by which a font set may be automatically activated or revealed according to one or more aspects described herein.

As noted, FIG. 7 illustrates a method for automatically activating fonts for applications using font sets. In step 700, the font manager (e.g., manager 220 of FIG. 2) may receive a notification from an operating system indicating that an application is launching. The font manager may request temporarily halting of the application launch in step 705. Halting of the application may be performed so that fonts may be loaded into the system prior to the application being activated. Accordingly, the application is prevented from fully launching. In step 710, the font manager may determine the font set(s) associated with the application being launched. For example, the font manager may use a look-up table that stores associations between the application and one or more font sets. In step 715, the font manager may determine whether the fonts included in the identified font set(s) have been activated already. Such a determination may be performed by requesting a list of activated fonts from the underlying operating system or by examining a list of activated fonts stored in system memory. Fonts may already be activated if they are used by other applications currently running on the system, for instance.

If one or more fonts in the font set(s) have not been activated, the font manager may determine whether those fonts are pre-activated in step 720. In one or more arrangements, the font manager may maintain font status information for fonts that it is managing to determine whether a font is activated, pre-activated and hidden, deactivated and the like. Alternatively or additionally, the font manager may consult a system process to determine the status of fonts. If the one or more fonts are pre-activated, the font manager may unhide or reveal the pre-activated fonts in step 730. Unhiding a font may include requesting that the operating system start providing font status messages to all active processes.

If the one or more fonts have not been fully activated, the font manager may activate the fonts in step 725. As noted herein, activation of the fonts may include loading the fonts into system memory (e.g., RAM) and font information such as font status messages may be made available to one or more active applications including the application being launched.

After all the font sets associated with the launching application have been activated, the font manager then allows the application to resume launching in step 735.

Figure 8:
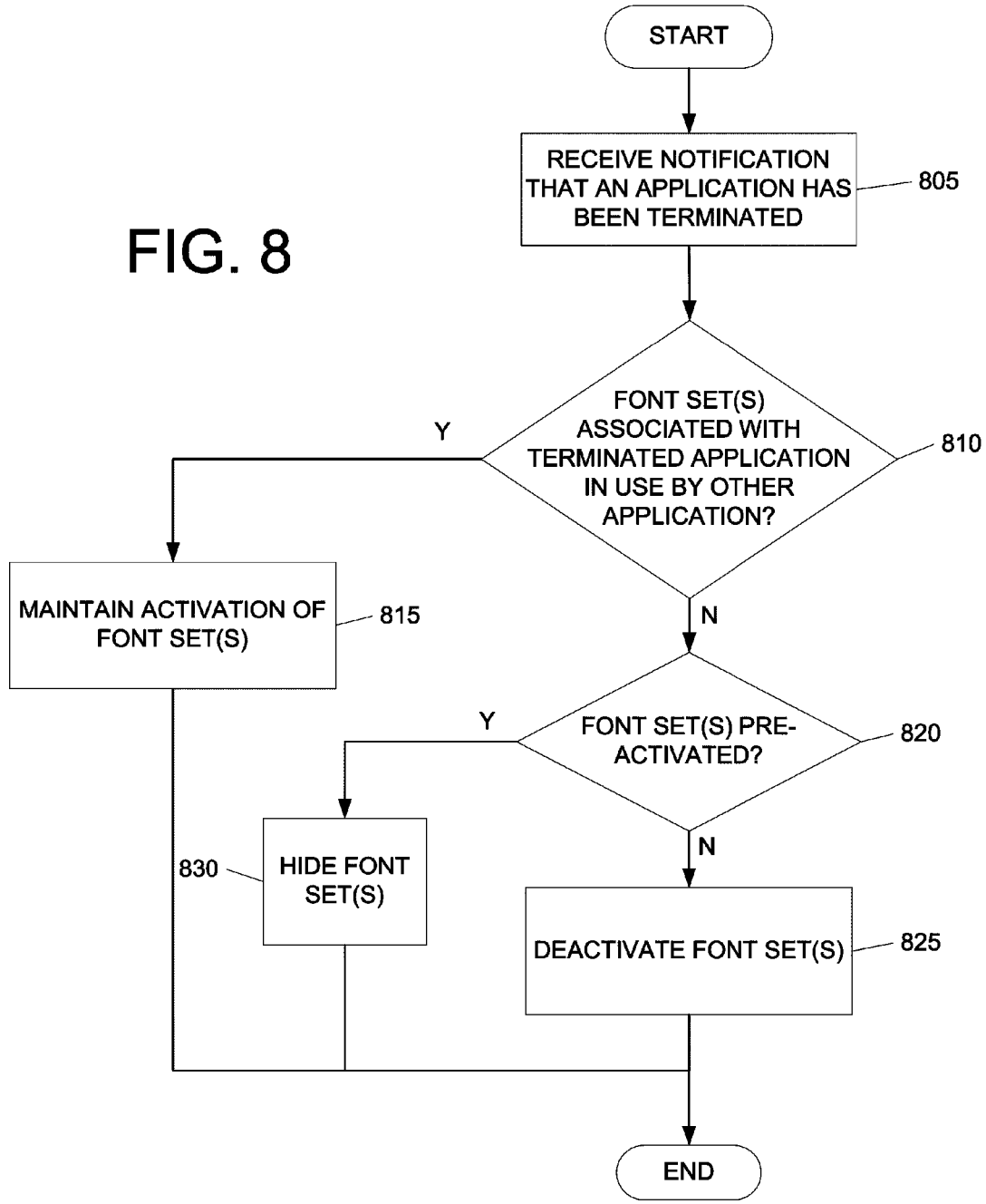
FIG. 8 is a flowchart illustrating an example of a method by which a font set may be deactivated/hidden after an application is terminated according to one or more aspects described herein.

FIG. 8 illustrates a method by which font sets may be hidden or deactivated when they are no longer needed for an application. The method may be performed by a computing device shown in FIG. 2. In step 805, a font manager may receive a notification from the operating system that an application has been terminated. Alternatively or additionally, the font manager may monitor a list of active applications or processes running on the system. In step 810 the font manager determines whether the font set associated with the terminated application is in use by another application to avoid deactivating or hiding the font set needed by another application. This determination may be made by identifying those active applications for which fonts are being managed by the font manager and subsequent identifying overlaps between the font sets and fonts associated with those applications. If a font or font set is in use by another active application, then the font manager may maintain the activation of the font or font set in step 815. That is, the font or font set might not be unloaded from memory or otherwise deactivated from the system. However, if the font set is not being used by another application, then in step 820 the font manager determines whether to hide or deactivate the font set, depending on whether the font set was pre-activated. The font manager hides the revealed font set if it was pre-activated in step 830, otherwise the font manager deactivates the activated font set in step 825. Alternatively, the font might be deactivated or hidden regardless of whether the font or font set was previously pre-activated.

The methods and apparatuses described herein provide certain benefits to the user. The font sets support automatic activation of fonts for applications that do not have application programming interfaces, providing a global solution for supporting any application. Font sets also support automatic activation of fonts for applications that do not recognize font activations or deactivations that occur after an application is launched or terminated. Furthermore, in the case of pre-activating the font sets in the font manager at start-up, it is much faster to hide and reveal font sets than activate or deactivate them.

The methods and features recited herein may further be implemented through any number of computer readable media that are able to store computer readable instructions. Examples of computer readable media that may be used include random access memory (RAM), read-only memory (ROM), electrically erasable programmable read-only memory (ROM), flash memory, compact disk read-only memory (CD-ROM), digital versatile disc (DVD), magnetic cassettes, magnetic tape, magnetic storage, or other memory technology.

Additionally or alternatively, in at least some embodiments, the methods and features recited herein may be implemented through one or more integrated circuits (ICs). An integrated circuit may be a microprocessor that accesses programming instructions or other data stored in a in a read only memory (ROM). In some embodiments, the ROM stores programming instructions that cause the IC to perform operations according to one or more of the methods described herein. In at least some other embodiments, one or more of the methods described herein are hardwired into an IC. In other words, the IC is, in such cases, an application specific integrated circuit (ASIC) having gates and other logic dedicated to the calculations and other operations described herein. In still other embodiments, the IC may perform some operations based on execution of programming instructions from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described system and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

What is claimed is:

1. A method comprising:
   receiving, at a font manager, notification from an operating system of a computing apparatus that a first application is being launched;
   prior to launching of the first application being completed, interrupting the launch of the first application;
   determining a first font set associated with the first application, the first font set including one or more fonts;
   resuming launch of the first application after activating each of the one or more fonts included in the first font set;
   receiving notification from the operating system indicating that the first application has been terminated;
   determining that the one or more fonts of the first font set is not in use by a second application; and
   deactivating the one or more fonts of the first font set, wherein deactivating the one or more fonts includes hiding the first font set, wherein hiding the first font set includes preventing font status messages for the one or more fonts from being sent to one or more processes executing in the operating system.

2. The method according to claim 1, further comprising:
   creating the first font set associated with the first application in a font manager by populating the first font set with a collection of user-selected fonts; and
   receiving a user selection of the first application for associating with the first font set.

3. The method according to claim 1, wherein the first application is associated with a plurality of font sets, and wherein launching the first application includes activating fonts included in the plurality of font sets.

4. The method according to claim 1, wherein the first font set is associated with a plurality of applications.

5. The method according to claim 1, further comprising:
   determining whether the operating system supports pre-activation of the first font set; and pre-activating the first font set in response to determining that the operating system supports pre-activation, wherein pre-activation includes:
   loading the one or more fonts into memory, and
   preventing font status messages for the one or more fonts from being sent to one or more processes executing in the operating system.

6. The method according to claim 1, wherein activating each of the one or more fonts included in the first font set prior to launching of the first application being completed includes:
   determining that the first font set has been pre-activated; and
   revealing the first font set associated with the first application.

7. The method according to claim 1, further comprising:
   receiving notification from the operating system indicating that the first application has been terminated; and
   responsive to determining that at least one font of the first font set is in use by a second application, maintaining the at least one font in an activated state.

8. The method according to claim 7, wherein at least one of the notification from the operating system that a first application is being launched and the notification from the operating system indicating that the first application has been terminated is received through a kernel hook.

9. An apparatus comprising:
   a processor; and
   memory operatively coupled to the processor and storing computer readable instructions that, when executed, cause the apparatus to:
   receive, at a font manager, notification from an operating system that a first application is being launched;
   prior to launching of the first application being completed, interrupt the launch of the first application;
   determine a first font set associated with the application, the first font set including one or more fonts;
   resume launch of the first application after activating each of the one or more fonts included in the first font set;
   receive notification from the operating system indicating that the first application has been terminated;
   determine that the one or more fonts of the first font set is not in use by a second application; and
   deactivate the one or more fonts of the first font set, wherein deactivating the one or more fonts includes hiding the first font set, wherein hiding the first font set includes preventing font status messages for the one or more fonts from being sent to one or more processes executing in the operating system.

10. The apparatus according to claim 9, wherein the computer readable instructions, when executed, further cause the apparatus to:
    create the first font set associated with the first application in a font manager by populating the first font set with a collection of user-selected fonts; and
    receive a user selection of the first application for associating with the first font set.

11. The apparatus according to claim 9, wherein the first application is associated with a plurality of font sets, wherein launching the first application includes activating fonts included in the plurality of font sets.

12. The apparatus according to claim 9, wherein the computer readable instructions, when executed, further cause the apparatus to:
    determine whether the operating system supports pre-activation of the first font set; and
    pre-activate the first font set in response to determining that the operating system supports pre-activation, wherein pre-activation includes:
    loading the one or more fonts into memory; and
    preventing font status messages for the one or more fonts from being sent to one or more processes executing in the operating system.

13. One or more non-transitory computer readable media storing computer executable instructions that, when executed, cause an apparatus to:

receive, at a font manager, notification from an operating system that a first application is being launched;

prior to launching of the first application being completed, interrupt the launch of the first application;

determine a first font set associated with the first application, the first font set including one or more fonts;

resume launch of the first application after activating each of the one or more fonts included in the first font set;

receive notification from the operating system indicating that the first application has been terminated;

determine that the one or more fonts of the first font set is not in use by a second application; and deactivate the one or more fonts of the first font set, wherein deactivating the one or more fonts includes hiding the first font set, wherein hiding the first font set includes preventing font status messages for the one or more fonts from being sent to one or more processes executing in the operating system.

14. The one or more non-transitory computer readable media according to claim 13, wherein the executable instructions, when executed, further cause the apparatus to:

create the first font set associated with the first application in a font manager by populating the first font set with a collection of user-selected fonts; and receive a user selection of the first application for associating with the first font set.

15. The one or more non-transitory computer readable media according to claim 13, wherein the executable instructions, when executed, further cause the apparatus to:

determine whether the operating system supports pre-activation of the first font set; and pre-activate the first font set in response to determining that the operating system supports pre-activation, wherein pre-activation includes:

loading the one or more fonts into memory; and preventing font status messages for the one or more fonts from being sent to one or more processes executing in the operating system.

\* \* \* \* \*